(12) United States Patent
Kinoshita

(10) Patent No.: US 6,401,893 B1
(45) Date of Patent: Jun. 11, 2002

(54) ONE-WAY CLUTCH ASSEMBLY

(75) Inventor: Yoshio Kinoshita, Shizuoka-ken (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/610,002

(22) Filed: Jul. 5, 2000

(30) Foreign Application Priority Data

Jul. 12, 1999 (JP) ............................................ 11-197394

(51) Int. Cl.⁷ .............................................. F16D 71/00
(52) U.S. Cl. .................................. 192/45.1; 192/113.32
(58) Field of Search ............................. 192/45.1, 41 R, 192/113.1, 113.3, 113.32

(56) References Cited

U.S. PATENT DOCUMENTS 4,068,748 A * 1/1978 Charchian et al. ......... 192/41 A
5,474,152 A * 12/1995 Wilkinson et al. ......... 192/41 A

* cited by examiner

Primary Examiner—Saul Rodriguez
(74) Attorney, Agent, or Firm—Miles & Stockbridge P.C.

(57) ABSTRACT

A one-way clutch assembly comprises an outer race having a substantially annular inner peripheral raceway surface, an inner race radially spaced apart from the outer race and disposed concentrically therewith for rotation relative thereto, and having a substantially annular outer peripheral raceway surface, and a plurality of torque transmitting members disposed between the outer race and the inner race and engaged with the inner peripheral raceway surface and the outer peripheral raceway surface for transmitting torque between the inner and outer races, and is provided with a lubricant reservoir extending from the diameter of the outer peripheral raceway surface of the inner race to the inner diameter side thereof.

6 Claims, 4 Drawing Sheets

ONE-WAY CLUTCH ASSEMBLY

BACKGROUND OF THE INVENTION

1. Field of the Invention

This invention relates to a one-way clutch assembly utilized in the transmission or the like of an automobile or an ordinary industrial machine such as an agricultural machine, a construction machine or an industrial machine. More particularly, it relates to a one-way clutch assembly of the hermetically sealed type provided with a lubricant reservoir.

2. Related Background Art

A one-way clutch used in an automatic transmission or the like has an outer race and an inner race rotated relative to each other, and a plurality of torque transmitting members for transmitting torque between the outer race and the inner race mesh with the raceway surfaces of the outer race and the inner race to thereby transmit rotational torque only in one direction. Also, design is made such that the outer and inner races are idly rotated in the opposite direction.

Generally, almost all of one-way clutches used in automobiles, etc. were forcibly lubricated from the inner race side of the one-way clutch. Particularly in a one-way clutch of the outer race rotation type in which the outer race side is rotated, lubricant flies to the outer diameter side by a centrifugal force and the lubricant runs short on the inner diameter side on which slip occurs, and the wear of the one-way clutch is induced. Therefore, the one-way clutch of the outer race rotation type is forcibly lubricated, and a one-way clutch of the package type in which lubricant is packed has been regarded as being unsuitable for the outer race rotation type.

As an example of the prior art, there is a package type one-way clutch 50 with an oil reservoir shown, for example, in FIG. 5 of the accompanying drawings. This example is not of a type in which lubricant (grease) is enclosed in the interior or surrounding space of the one-way clutch 50 which is hermetically sealed from the outside, but is provided with an oil reservoir storing lubricant on the axial outer side of a one-way clutch unit.

As shown in FIG. 5, in the one-way clutch 50 of this kind, a driving force from a high-speed rotation motor, not shown, is transmitted by a belt 51, and a belt 52 is connected to an output shaft, not shown. The one-way clutch 50 comprises an inner race 57, an outer race 56 provided outside thereof, and a one-way clutch mechanism portion 55 for transmitting torque between the inner race 57 and the outer race 56.

Bearings 58 and 59 are provided on the axially opposite sides of the one-way clutch mechanism portion 55. Seals 60 and 61 are provided between the inner race 57 and its partner member. An oil reservoir 53 is provided on the axially outer side of the one-way clutch mechanism portion 55. When the high-speed rotation motor is rotated, the lubricant escapes to the outer race side due to a centrifugal force created by high-speed rotation and therefore, the exhaustion of the lubricant may occur particularly on the outer peripheral raceway surface of the inner race. In order to prevent this, a predetermined amount of lubricant is supplied from the outside to the oil reservoir 53 through an oil supply hole 54 and is stored in the oil reservoir 53.

In the prior-art one-way clutch 50 of the above-described construction, (liquid) lubricant is supplied to the bearings and the interior of the one-way clutch by the use of the centrifugal force created by the rotation of the one-way clutch. In this example, however, it is necessary to provide an oil reservoir occupying a great volume on the axially outer side of the unit and therefore, the mounting space has naturally become large, and it has been unavoidable that the number of parts become great.

As described above, in the one-way clutch of the outer race rotation type, the lubricant is scattered to the outer diameter side by the centrifugal force and therefore, the lubricant runs short on the inner diameter side on which the one-way clutch effects sliding and meshing engagement. Remarkable wear might occur to the various elements (a torque transmitting member, etc.) of the one-way clutch which effects sliding and meshing engagement on the surface on which the lubricant is absent. Particularly, a one-way clutch of the package type having lubricant enclosed therein has been regarded as being unsuitable for being used in outer race rotation.

It is actually difficult and not realistic to enclose 100% of lubricant in the space of the one-way clutch of the package type and therefore, the above-noted problems remain left to be solved.

SUMMARY OF THE INVENTION

Accordingly, it is an object of the present invention to provide a one-way clutch assembly in which the sliding portion and meshing portion of each element of the one-way clutch are filled with lubricant and the wear of each portion can be suppressed for sufficient lubricant film. It is also an object of the present invention to provide particularly a one-way clutch assembly suitable for the package type.

To solve the above-noted problems, the one-way clutch assembly of the present invention is a one-way clutch assembly comprising an outer race having a substantially annular inner peripheral raceway surface, an inner race radially spaced apart from the outer race and disposed concentrically therewith for rotation relative thereto, and having a substantially annular outer peripheral raceway surface, and a plurality of torque transmitting members disposed between the outer race and the inner race and engaged with the inner peripheral raceway surface and the outer peripheral raceway surface for transmitting torque between the inner and outer races, characterized by the provision of a lubricant reservoir extending from the diameter of the outer peripheral raceway surface of the inner race to the inner diameter side thereof.

When the outer race is rotated, the portion sandwiched between the inner peripheral raceway surface of the outer race of the one-way clutch assembly and the outer peripheral raceway surface of the inner race is provided with a lubricant reservoir for securing an amount of lubricant enough to be filled with lubricant flying to the outer diameter side by a centrifugal force on the inner diameter side from the raceway diameter of the inner race.

The lubricant stored in the lubricant reservoir goes toward the outer diameter side and fills the space between the raceway surfaces of the one-way clutch assembly when the centrifugal force of the rotation of the outer race is applied. A similar action also takes place in the case of a centrifugal force created around the inner race by the rotation of the inner race. When the inner race is rotated simultaneously with the rotation of the outer race, an action similar to that only in the case of the rotation of the outer race takes place.

DESCRIPTION OF THE PREFERRED EMBODIMENTS

Figure 1:
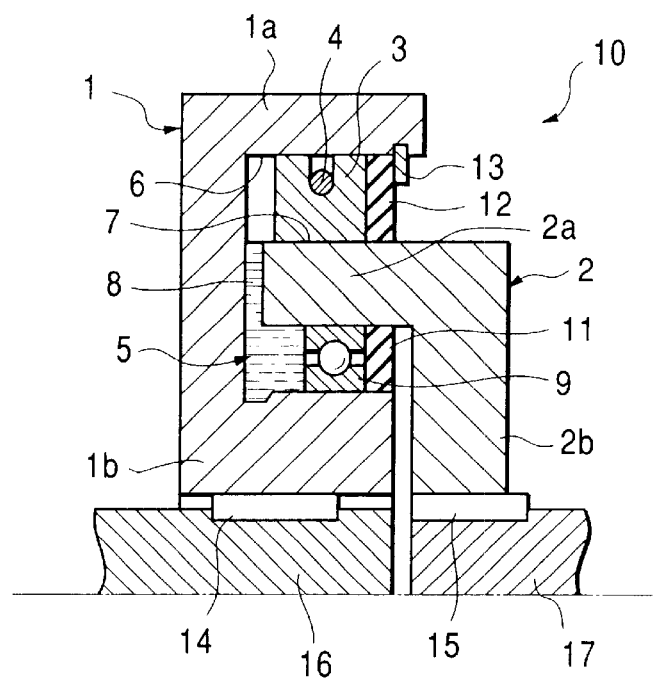
FIG. 1 is an axial fragmentary cross-sectional view showing a one-way clutch assembly according to a first embodiment of the present invention.

The present invention will hereinafter be described in detail with reference to the accompanying drawings. In the drawings, like portions are designated by like reference characters.

First Embodiment

FIG. 1 is an axial fragmentary cross-sectional view showing a one-way clutch assembly 10 according to a first embodiment of the present invention, and shows a radial half thereof. In the following embodiments including the present embodiment, for the convenience of description, the "one-way clutch assembly" will be referred to as the "one-way clutch".

The one-way clutch 10 is provided with an outer race 1 spline-engaged with a shaft 16 through a key 14, and an inner race 2 spline-engaged with a shaft 17 through a key 15. The outer race 1 is provided with a cylinder portion 1b spline-engaged with the shaft 16, and a cylinder portion 1a radially opposed to the cylinder portion 1b with a predetermined gap therebetween and having a larger diameter than the cylinder portion 1b. The cylonder portions 1a and 1b are integrally coupled together by a substantially annular disc portion.

On the other hand, the inner race 2 is provided with a substantially annular disc portion 2b spline-engaged with the shaft 17, and a cylinder portion 2a integrally coupled to the disc portion 2b. The cylinder portion 2a has a diameter smaller than that of the cylinder portion 1a of the race 1 and larger than that of the cylinder portion 1b, and is disposed between the two cylinder portions 1a and 1b, as shown in FIG. 1.

A one-way clutch mechanism is disposed in a substantially annular space defined between the inner peripheral raceway surface 6 of the cylinder portion 1a of the outer race 1 and the outer peripheral raceway surface 7 of the cylinder portion 2a of the inner race 2. The one-way clutch mechanism has a plurality of circumferentially equidistantly disposed torque transmitting members, i.e., in a groove formed through the spray 3 circumferentially thereof. The sprag 3 pivotably held by the garter spring 4 meshes with the inner peripheral raceway surface 6 of the outer race 1 and the outer peripheral raceway surface 7 of the inner race 2, whereby the one-way clutch 10 is locked in one direction.

A substantially annular seal member 12 formed of e.g. silicone rubber is disposed adjacent to the spray 3 in the axial open end of the space in which the one-way clutch mechanism is disposed. Outside the seal member 12, a annular snap ring 13 is fixed to the cylinder portion 1a of the outer race 1. Accordingly, the spray 3 and the seal member 12 have their axial movement limited by the snap ring 13 and therefore do not come off.

Also, a bearing 9 is fitted in a substantially annular space defined between the small-diametered cylinder portion 1b of the outer race 1 and the cylinder portion 2a of the inner race 2. Adjacent to the bearing 9, a substantially annular seal member 11 is fitted to the axial end portion of the cylinder portion 1b. Accordingly, the two upper and lower spaces defined by the two cylinder portions 1a and 1b of the outer race 1 and the cylinder portion 2a of the inner race 2 and communicating with each other are kept in a substantially hermetically sealed state by the two seal members 12 and 11.

The space defined between the cylinder portion 1b of the outer race 1 and the cylinder portion 2a of the inner race 2 and between the bearing 9 and the cylinder portion of the outer race 1, i.e., the lower space, provides a lubricant reservoir 5. The oil surface of this lubricant reservoir 5 is substantially flush with the outer peripheral raceway surface 7 of the inner race 2, as shown in FIG. 1. The oil surface, however, may be positional below the outer peripheral raceway surface 7. This lubricant reservoir 5 is filled with grease or other lubricant. When grease is used, it is preferable to use one having compatibility with other lubricants. In the first embodiment, the one-way clutch mechanism and the bearing 9 are lubricated by the lubricant filling the lubricant reservoir 5.

Second Embodiment

Figure 2:
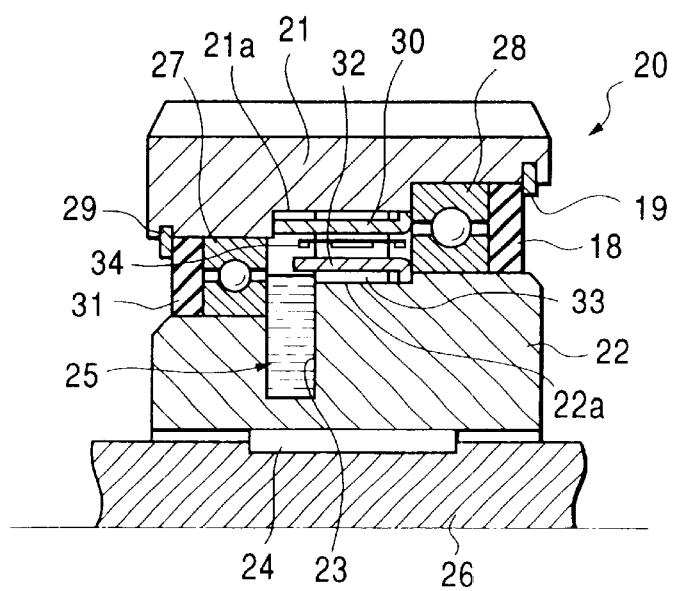
FIG. 2 is an axial fragmentary cross-sectional view showing a one-way clutch assembly according to a second embodiment of the present invention.

FIG. 2 is an axial fragmentary cross-sectional view showing a one-way clutch 20 according to a second embodiment of the present invention, and shows a radial half thereof.

The one-way clutch 20 is provided with an outer race 21 spline-coupled to other member, and an inner race 22 spline-engaged with a shaft 26 through a key 24. The outer race 21 is provided with a spline on the outer diameter side thereof, and is provided with three substantially annular inner peripheral surfaces of different diameters on the inner diameter side thereof. The inner race 22 is also provided with three substantially annular outer peripheral surfaces opposed to respective ones of the three inner peripheral surfaces of the outer race.

Among the inner peripheral surfaces and the outer peripheral surfaces of the outer race 21 and the inner race 22, respectively, bearings 27 and 28 are fitted between the inner and outer peripheral surfaces of the axially opposite ends. The peripheral surfaces having a diameter intermediate of the inner and outer peripheral surface of the opposite ends provide the inner peripheral raceway surface 21a of the outer race 21 and the outer peripheral raceway surface 22a of the inner race 22, respectively. A one-way clutch mechanism is fitted between the inner peripheral raceway surface 21a and the outer peripheral raceway surface 22a.

The one-way clutch mechanism comprises a ground-shaped (see FIG. 4) spray 33 for transmitting torque between the inner and outer peripheral surfaces, a ribbon spring 34 giving a rising moment to the spray 33, and an outer holder 30 and an inner holder 32 for holding the spray 33.

A substantially annular seal member 31 for keeping the one-way clutch 20 in a substantially hermetically sealed state is provided on the axially outer side of the bearing 27. The seal member 31 is axially fixed by a snap ring 29 fixed to the outer race 21. A substantially annular seal member 18 for keeping the one-way clutch 20 in a substantially hermetically sealed state is provided on the axially outer side of the other bearing 28. The seal member 18 is axially fixed by a snap ring 19 fixed to the outer race 21.

A radially inwardly extending lubricant reservoir 25 is provided in the inner race 22 at a location in a portion of the outer peripheral raceway surface 22a of the inner race 22 which is adjacent to the bearing 27. The lubricant reservoir 25 is formed as a groove 23 formed radially inwardly from the outer peripheral raceway surface 22a of the inner race 22.

Again in the second embodiment, the one-way clutch and the bearings 27 and 28 are lubricated by the lubricant filling the lubricant reservoir 25.

Third Embodiment

Figure 3:
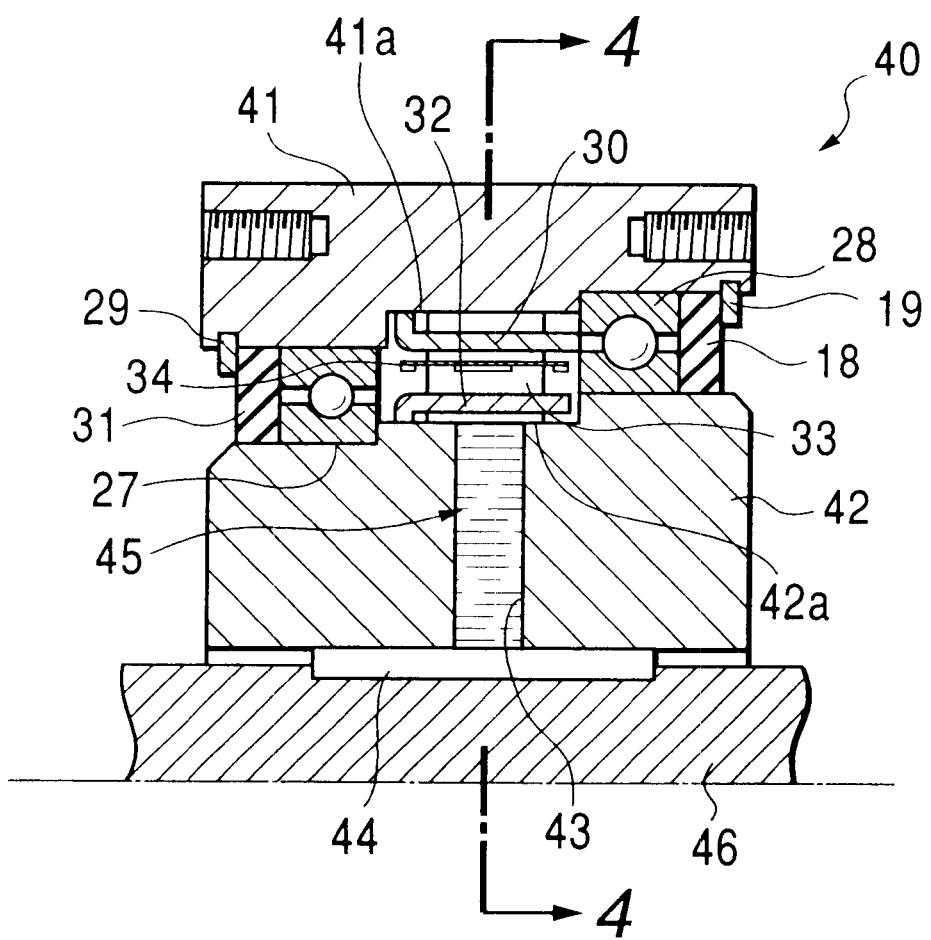
FIG. 3 is an axial fragmentary cross-sectional view showing a one-way clutch assembly according to a third embodiment of the present invention.

FIG. 3 is an axial fragmentary cross-sectional view showing a one-way clutch 40 according to a third embodiment of the present invention, and shows a radial half thereof.

The one-way clutch 40 is provided with an outer race 41 fixed to other member, and an inner race 42 spline-engaged with a shaft 46 through a key 44. The outer race 41 is provided with three substantially annular inner peripheral surfaces of different diameters on the inner diameter side thereof. The inner race 42 is also provided with three substantially annular outer peripheral surfaces opposed to respective ones of the three inner peripheral surfaces of the outer race.

Among the inner peripheral surfaces and the outer peripheral surfaces of the outer race 41 and the inner race 42, respectively, bearings 27 and 28 are fitted between the inner and outer peripheral surfaces of the axially opposite ends. The peripheral surfaces having a diameter intermediate of the inner and outer peripheral surfaces of the opposite ends provide the inner peripheral raceway surface 41a of the outer race 41 and the outer peripheral raceway surface 42a of the inner race 42. A one-way clutch mechanism is fitted between the inner peripheral raceway surface 41 and the outer peripheral raceway surface 42a.

The one-way clutch mechanism comprises a ground-shaped (see FIG. 4) sprag 33 for transmitting torque between the inner and outer peripheral surfaces, a ribbon spring 34 giving a rising moment to the sprag 33, and an outer holder 30 and an inner holder 32 for holding the sprag 33.

A substantially annular seal member 31 for keeping the one-way clutch 40 in a substantially hermetically sealed state is provided on the axially outer side of the bearing 27. The seal member 31 is axially fixed by a snap ring 29 fixed to the outer race 41. Also, a substantially annular seal member 18 for keeping the one-way clutch 40 in a substantially hermetically sealed state is provided on the axially outer side of the other bearing 28. The seal member 18 is axially fixed by a snap ring 19 fixed to the outer race 41.

A radially inwardly extending lubricant reservoir 45 is provided at a substantially intermediate location in the axial direction of the outer peripheral raceway surface 42a of the inner race 42. The lubricant reservoir 45 is formed as a groove 43 formed radially inwardly from the outer peripheral raceway surface 42a of the inner race 42.

Again in the third embodiment, the one-way clutch mechanism and the bearings 27 and 28 are lubricated by the lubricant filling the lubricant reservoir 45.

Figure 4:
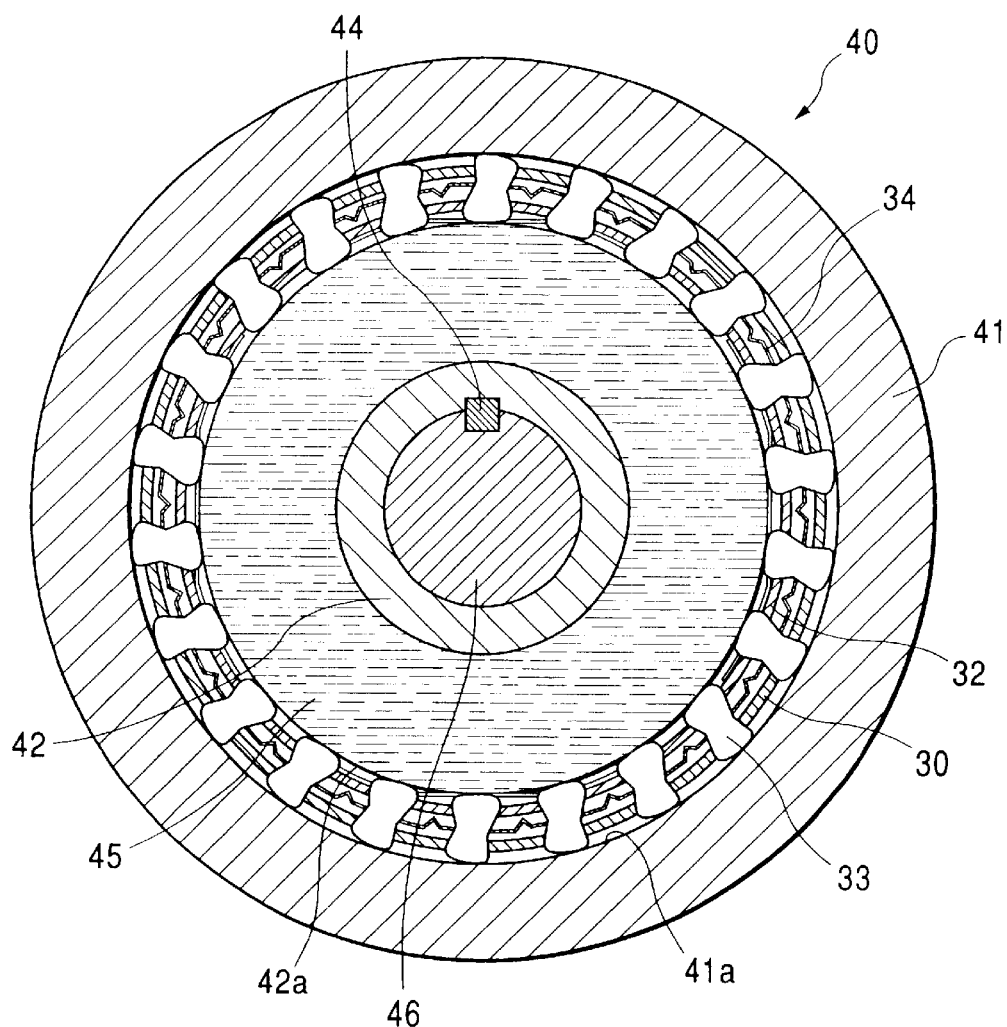
FIG. 4 is a cross-sectional view taken along the line 4—4 of FIG. 3.
Figure 5:
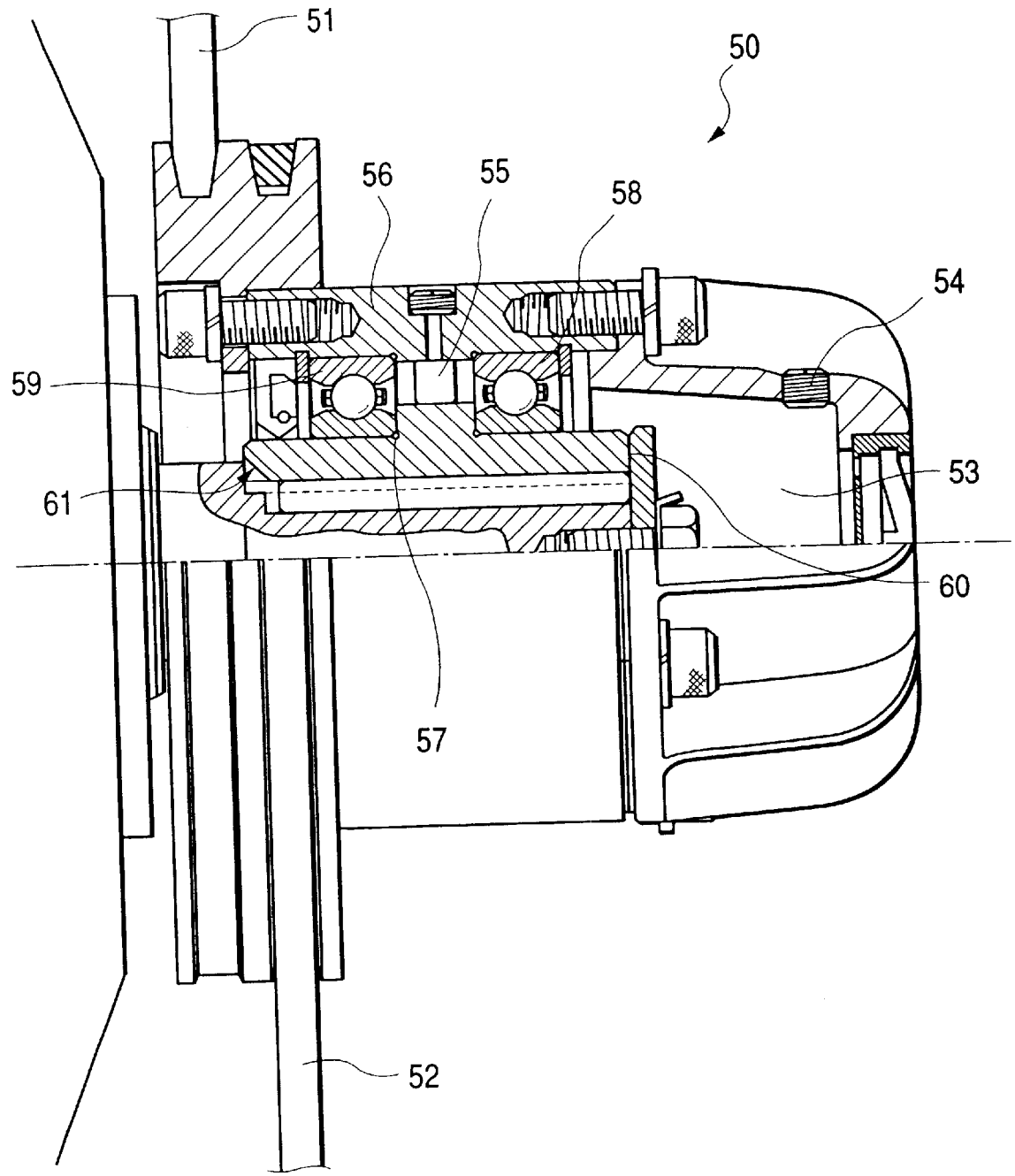
FIG. 5 is an axial fragmentary cross-sectional view showing a one-way clutch according to the prior art.

FIG. 4 is a cross-sectional view taken along the line 4—4 of FIG. 3, and shows the details of the lubricant reservoir 45 defined by the groove 43. As shown in FIG. 4, the groove 43 in the third embodiment is formed over the full circumference in the circumferential direction, but a plurality of grooves 43 can be formed at predetermined intervals in the circumferential direction, or a single groove 43 can be formed. This also holds true of the lubricant reservoirs 5 and 25 in the aforedescribed first and second embodiments.

In the above-described first to third embodiments, when the outer race is rotated, it is preferable that the portion sandwiched between the inner peripheral raceway surface of the outer race of the one-way clutch assembly and the outer peripheral raceway surface of the inner race secure an amount of lubricant enough to be filled with the lubricant flying to the outer diameter side by a centrifugal force in the lubricant reservoir.

The lubricant stored in the lubricant reservoir goes toward the outer diameter side and fills the space between the raceway surfaces of the one-way clutch assembly when the centrifugal force of the rotation of the outer race is applied. A similar action also takes place in the case of a centrifugal force created around the inner race by the rotation of the inner race. When the inner race is rotated simultaneously with the rotation of the outer race, an action similar to that only in the case of the rotation of the outer race takes place.

Also, as the torque transmitting member, a roller or the like engaged with the cam surfaces of the inner and outer races can be used instead of the sprags shown in the first to third embodiments. Also, while in the second and third embodiments, the sprag is held by the two outer and inner holders, it can also be held by a single holder.

Further, in the first to third embodiments, the one-way clutch assembly is sealed from the outside by the seal member, that is, is kept in its hermetically sealed state, and this is more effective for a one-way clutch assembly of the so-called package type. However, the present invention can of course be also applied to other one-way clutch assemblies than the one-way clutch assembly of the package type. The present invention can also be applied, for example, to a one-way clutch assembly in which a seal member is not provided and a lubricant reservoir is filled with grease or lubricant, and early lubrication is effected by the grease or lubricant discharged from the lubricant reservoir by a centrifugal force, whereafter lubrication is effected by lubricant from the outside. In that case, it is preferable that the grease have compatibility with the lubricant supplied from the outside. Also, even when the grease or lubricant filling the lubricant reservoir at an early state flows out to the outside during the operation of the one-way clutch assembly, the lubricant from the outside fills the lubricant reservoir and therefore, it never happens that the lubricant becomes exhausted and adversely affects the one-way clutch assembly.

According to the above-described one-way clutch assembly of the present invention, there are obtained the following effects.

The wear of the various portions of the one-way clutch assembly, i.e., the inner and outer races, the sprag, the cam, the roller, etc., can be minimized because the sliding portion and the meshing portions are filled with the lubricant.

Also, the saving of the space can be realized by providing the lubricant reservoir in the inner race. Further, by providing the lubricant reservoir in the outer peripheral raceway surface of the inner race, whereby the lubricant can be supplied to the one-way clutch assembly by the effective use of a centrifugal force.

Also, if the lubricant reservoir is filled with grease of relatively high viscosity, oil leakage can be prevented and a one-way clutch assembly of the package type can be provided.

The exhaustion of lubricant can be prevented if the lubricant reservoir is designed to be capable of being filled with an amount of lubricant more than filling the outer peripheral raceway surface of the inner race under a centrifugal force, together with the total amount of initially enclosed lubricant.

What is claimed is:

1. A one-way clutch assembly, comprising:

an outer race having a substantially annular inner peripheral raceway surface, an inner race radially spaced apart from said outer race and disposed concentrically therewith for rotation relative thereto, and having a substantially annular outer peripheral raceway surface, a plurality of torque transmitting members disposed between said outer race and said inner race and engaged with said inner peripheral raceway surface and said outer peripheral raceway surface for transmitting torque between said inner and outer races, and a lubricant reservoir extending from a diameter of the outer peripheral raceway surface of said inner race to an inner diameter side thereof, wherein said lubricant reservoir has a volume capable of being filled with an amount of lubricant which is more than filling a lubricant enclosing volume positioned from the diameter of the outer peripheral raceway surface of said inner race to the outer diameter side thereof, together with a total amount of initially enclosed lubricant.

2. A one-way clutch assembly according to claim 1, wherein said lubricant reservoir is provided in said inner race.

3. A one-way clutch assembly according to claim 1, wherein said lubricant reservoir is provided in the outer peripheral raceway surface of said inner race.

4. A one-way clutch assembly according to claim 1, wherein said lubricant reservoir is filled with grease.

5. A one-way clutch assembly according to claim 2, wherein said lubricant reservoir is filled with grease.

6. A one-way clutch assembly according to claim 3, wherein said lubricant reservoir is filled with grease.

* * * * *